Figure 1:
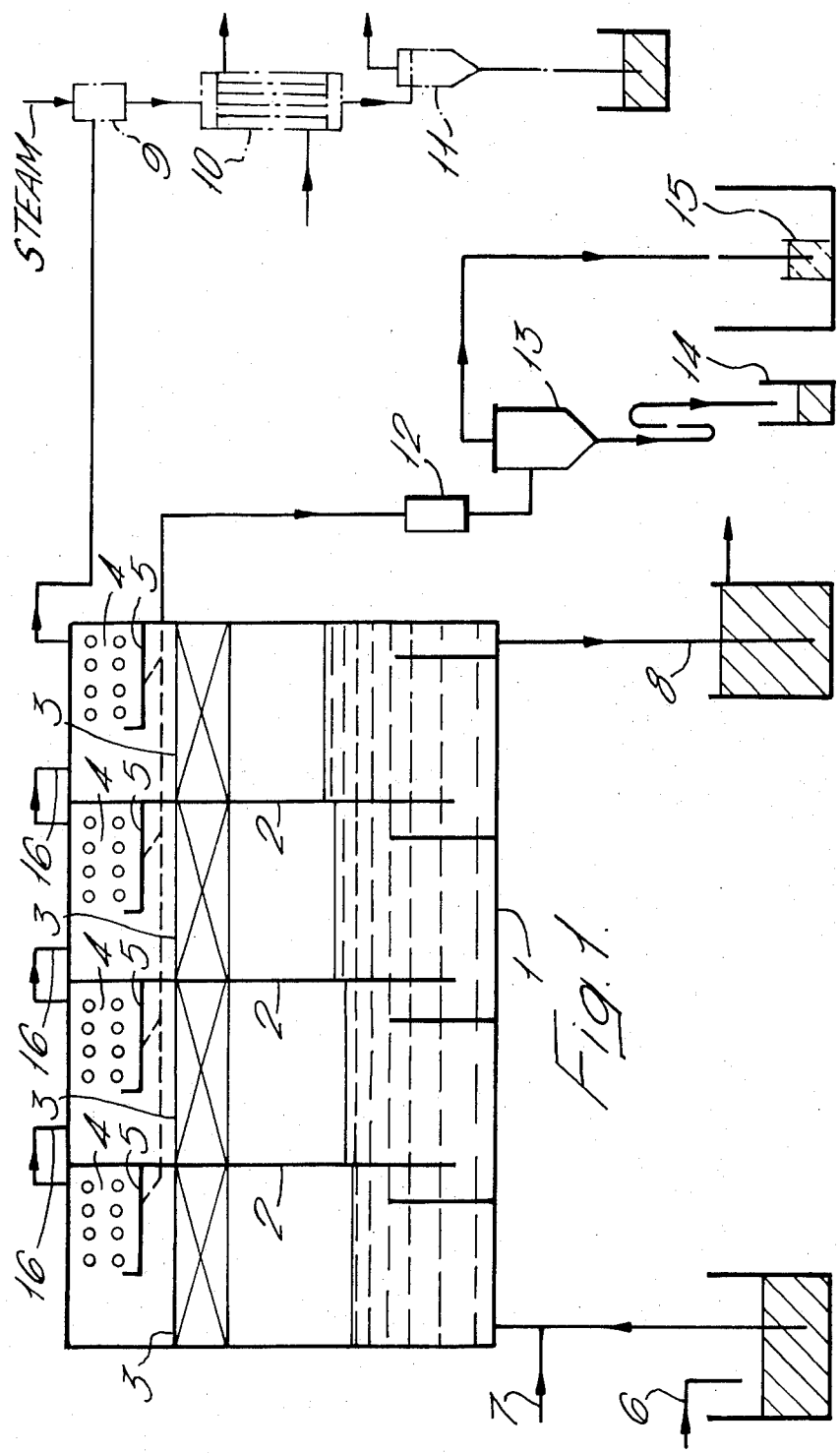

_United States Patent_ [19]

Coulter

[11] 3,857,704

[45] Dec. 31, 1974

[54] MERCURY RECOVERY PROCESS

[75] Inventor: Michael Oliver Coulter, near Crewe, England

[73] Assignee: BP Chemicals Limited, London, England

[22] Filed: Mar. 3, 1972

[21] Appl. No.: 231,527

[30] Foreign Application Priority Data

| | | |
|---|---|---|
| Mar. 5, 1971 | Great Britain | 6160/71 |
| Dec. 30, 1971 | Canada | 131395 |
| Dec. 19, 1971 | Belgium | 112372 |
| Dec. 29, 1971 | France | 71.7147214 |
| Dec. 21, 1971 | Germany | 2163599 |
| Dec. 24, 1971 | Netherlands | 7117816 |
| Dec. 30, 1971 | Italy | 33180/71 |

[52] U.S. Cl............. 75/121, 75/108, 210/50, 423/99, 423/101, 423/107, 203/32, 203/73

[51] Int. Cl................................... C22b 43/00

[58] Field of Search.......... 75/108, 121, 81; 210/45, 210/48, 50; 423/99, 101, 107; 202/173; 203/32, 73

[56] References Cited
UNITED STATES PATENTS

| | | | |
|---|---|---|---|
| 3,039,865 | 6/1962 | Gilbert et al. | 75/81 |
| 3,320,137 | 5/1967 | Jebens et al. | 202/173 |
| 3,324,009 | 6/1967 | Griffith et al. | 202/173 |
| 3,537,843 | 11/1970 | Jacobowsky | 75/81 |
| 3,679,396 | 7/1972 | Stenger | 75/81 |
| 3,695,838 | 10/1972 | Knepper et al. | 75/108 x |
| 3,734,835 | 5/1973 | Spicacci | 202/173 |

OTHER PUBLICATIONS

Weissberger, "Technique of Organic Chemistry-Distillation," Vol. 4, Interscience Publishers, Inc., N.Y., 1951, pp. 2,377,378.

Miller et al., "Analytical Chemistry," Vol. 22, 1950 pp. 1312-1315.

Kimura et al., "Analytical Chemical Acta," Vol. 27, 1962, pp. 325-331.

Rosenzweig, "Chemical Engineering," Feb. 22, 1971, pp. 70-71.

_Primary Examiner_—Herbert T. Carter
_Attorney, Agent, or Firm_—Brooks Haidt & Haffner

[57] ABSTRACT

A process for the recovery of mercury from aqueous solutions containing elemental mercury in finely divided or colloidal form or in the form of a soluble inorganic compound by treating the solution with a chemical reducing agent such as ferrous sulphate at a pH greater than 5, iron or steel turnings or chips, hydrazine, hydroxylamine, D-glucose and sodium borohydride with simultaneous removal of the resulting finely divided or colloidal mercury from the solution as a vapour and recovering the mercury from vapour. Methods of removing mercury as a vapour are by passing a stream of inert gas through the solution and steam distillation, which latter term includes injection of "live" steam and using the technique of single or multiple stage flash distillation under vacuum. A combination of the two methods is found most effective.

9 Claims, 3 Drawing Figures

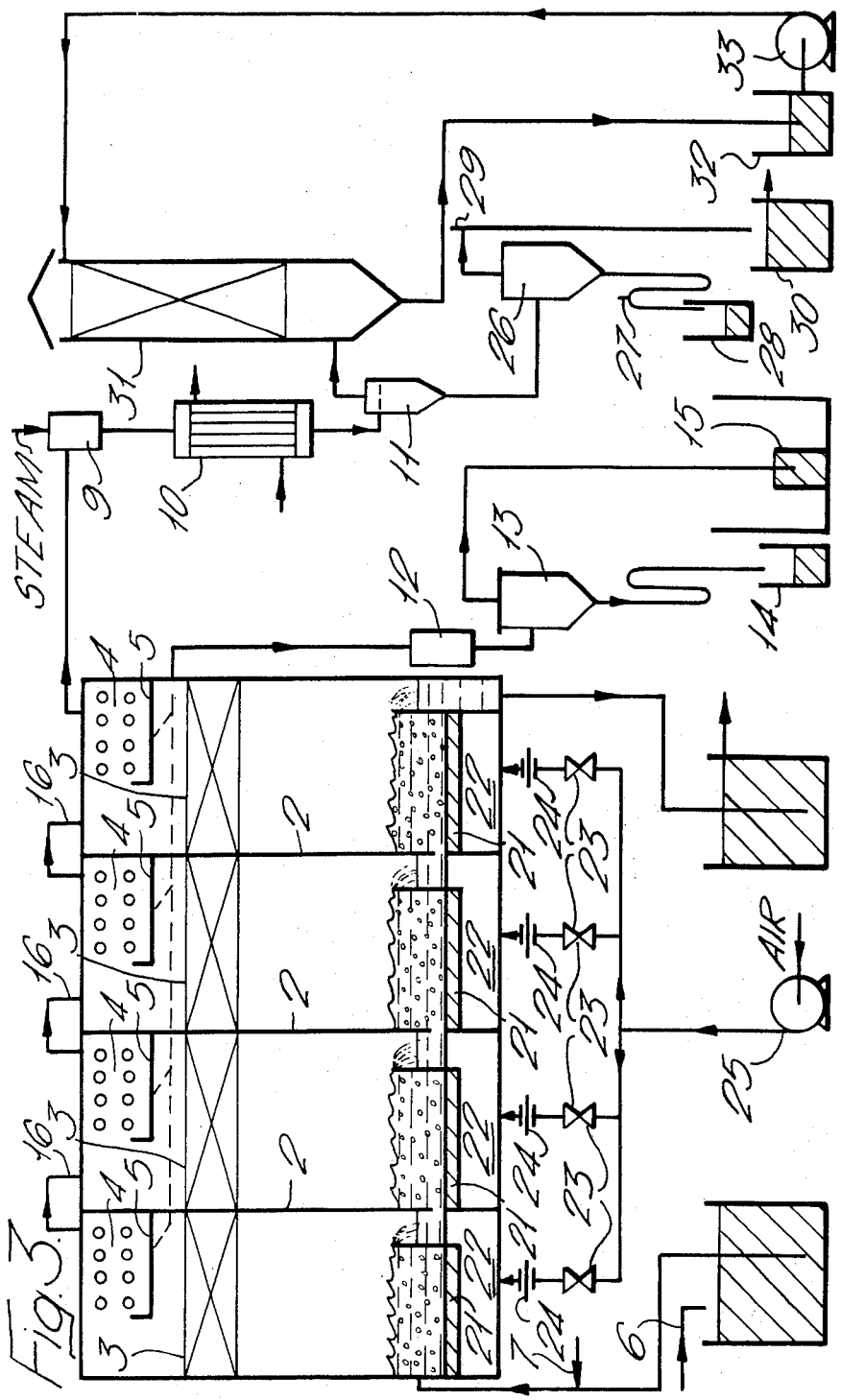

MERCURY RECOVERY PROCESS

The present invention relates to a method of recovering mercury from aqueous solutions in which the mercury is present in the elemental or combined form.

When mercury is employed in processing operations it is necessary owing to its toxic nature to reduce to a minimum the quantities that are discharged to the environment in whatever form, including liquid effluents that are discharged to water courses. This is of particular importance in the manufacture of chlorine and caustic soda by the electrolysis of brine in mercury cathode electrolytic cells where the depleted brine leaving the cells contains a small concentration of mercury, usually between 2 and 10 mg/$l$, either in the form of elemental mercury or mercury compounds. If this depleted brine is discharged to waste the value of the lost mercury is significant and the receiving water course may be polluted with mercury compounds to an unacceptable level. Even if the brine is recycled by saturating it with solid salt followed by the addition of reagents such as barium chloride or carbonate, sodium carbonate or sodium hydroxide to remove impurities derived from the solid salt some or all of the mercury present in the depleted brine may be lost with the precipitate. This loss is particularly severe if sodium sulphide is used in the brine treatment process to remove residual free chlorine and to precipitate heavy metals. Removal of mercury from the depleted brine is even more important if the weak brine is resaturated by pumping it into underground rock salt strata because its presence may cause serious corrosion of the pipelines and well tubing and some mercury would otherwise be lost in the brine that remains in the underground cavity. The liquid effluent from plants in which mercury compounds are processed or mercury is used in the manufacture of, for example chlorine, are liable to contain mercury salts in solution in addition to elemental mercury. It is desirable that this mercury should be removed not only for economic reasons but even more important to prevent pollution of receiving water courses.

Known processes for the removal of mercury from aqueous solutions include treatment with sodium sulphide, passage through a tower packed with steel turnings, percolation through a bed of activated carbon and treatment with ion exchange resins. All these processes suffer from disadvantages. Thus treatment with sodium sulphide has the following disadvantages:- a. It is difficult to control the process so that the final mercury content is sufficiently low, i.e. 0.1 mg/$l$ or less.

b. Any excess of sodium sulphide, which is itself a polluting material, is liable to re-dissolve precipitated mercuric sulphide.

c. Very large vessels with long retention times may be necessary to settle out the precipitate even with the aid of entrainers such as iron salts and flocculants.

d. Recovery of the mercury from the precipitated mercury sulphide is difficult and expensive.

The disadvantages of removing mercury by percolation through a bed packed with steel turnings are as follows:

a. The process is slow and requires a large volume of steel turnings.

b. Steel is liable to become inactive through amalgamation.

c. The mercury separates as a slime which requires further processing such as distillation before it can be recovered in useable form.

The use of activated carbon is not normally satisfactory because mercury is adsorbed irreversibly and the capacity for mercury adsorption is small, although these disadvantages can be overcome by prior treatment of the activated carbon with a solution of a soluble sulphide.

Certain specialised ion exchange and chelation resins are claimed to be suitable for removal of inorganic mercury compounds from aqueous solutions. However, before a mercury containing solution can be treated in this way it must be free from suspended solids, and high equipment costs would be incurred if large volumes of liquor had to be treated by filtration or sedimentation. To recover mercury that has been removed by these resins it is necessary either to destroy the resin by retorting or to employ leaching procedures which involve several processing steps.

The present invention provides an improved process for the recovery of mercury from aqueous solutions in which the mercury is present either as elemental mercury in finely divided or colloidal form or in the form of a soluble inorganic compound. The process is particularly applicable for the recovery of small concentrations of mercury e.g. in the range 1 to 100 mg/litre.

Thus according to the present invention there is provided a process for the recovery of mercury from aqueous solutions containing elemental mercury in finely divided or colloidal form or in the form of a soluble inorganic compound which process comprises treating the solution with a chemical reducing agent, simultaneously removing the resulting finely divided or colloidal mercury from the solution as a vapour and recovering the mercury from the vapour.

In the process of the invention it is believed that several factors influence the achievement of the highest mercury recovery. Thus the nature of the chemical reducing agent and the manner of its addition to the main liquid stream is preferably such that the mercury is precipitated in an extremely fine state of sub-division at the prevailing temperature. Suitable reducing agents which may be employed are selected from ferrous sulphate at a pH greater than 5, hydrazine, iron or steel turnings or chips, hydroxylamine, D-glucose and sodium borohydride. When hydrazine, hydroxylamine, D-glucose or sodium borohydride are used it is preferable to operate in alkaline solution, suitably about pH 11. The preferred reducing agent is sodium borohydride.

The amount of reducing agent required in the process of the invention varies over a wide range and depends amongst other factors on the nature of the reducing agent and the compounds other than mercury compounds present in the aqueous solution. For sodium borohydride as little as a stoichiometric equivalent might be employed, whilst for ferrous sulphate more than twenty times the stoichiometric equivalent based on mercury might be required in the absence of reducible compounds of other metals.

The process of the invention may be extended to materials containing mercury in other forms, for instance organic mercury compounds or inorganic compounds insoluble in water, or as elemental mercury that is not in a sufficiently fine state of sub-division for the efficient operation of the process. In those cases it is necessary to convert the mercury to an inorganic compound soluble in water by a suitable pre-treatment. For example, elemental mercury may be oxidised with chlorine and organic compounds of mercury may be treated with nitric acid to convert them to soluble inorganic compounds. It may then be necessary to destroy any excess of the oxidising agent used.

It is possible to operate the process economically even in the presence of oxidising agents, such as hypochlorites and chlorates, which are commonly present in lean brine and in waste waters arising in the manufacture of chlorine by electrolysis of brine in mercury cathode calls. For instance an inexpensive reducing agent selected from sodium sulphite and sulphur dioxide may be used to chemically reduce hypochlorites. It is then possible to reduce mercuric ions to elemental mercury with the stoichiometric quantity or a small excess only of sodium borohydride, which is a costly reducing agent, and this second stage of reduction can be accomplished selectively even in the presence of soluble chlorates. The reducing agents listed above have been found effective in the presence of a high chloride concentration.

The finely divided or colloidal mercury may be removed from the aqueous solution as a vapour by passing a stream of inert gas through the solution.

Any inert gas may be used in the process of the invention but it is preferred to use air or nitrogen.

It is advantageous to carry out the process at elevated temperatures in order to accelerate the rate of reaction and to increase the vapour pressure of the metallic mercury. Thus temperatures in the range 35°C to 95°C are preferred, though the process is not limited to elevated temperatures.

It is believed that, except possibly when reduction takes place in the presence of solids such as iron or ferrous hydroxide, the process is most efficient when the mercury is present in what might be described as the "nascent" form ie immediately after chemical reduction before the atoms of mercury have had time to agglomerate beyond colloidal form. With most reducing agents the efficiency is greatest when addition of the reducing agent and inert gas blowing are simultaneous, although with D-glucose a short reaction time may be advantageous.

The mercury present as vapour in the inert gas stream may be recovered in useable form by the processes described in our British Pat. Specifications Nos. 1,207,215 and 1,250,171 British Pat. Specification No. 1,207,215 describes a process for recovering mercury vapour from the degassing air stream removed from the wash boxes for washing the mercury amalgam circulating through mercury cathode electrolytic cells by washing the stream with a solution of brine containing dissolved chlorine and cycling the brine solution containing the mercury to a mercury cathode electrolytic cell. British Pat. Specification No. 1,250,171 describes a method for recovering mercury from a stream of gas containing mercury vapour by scrubbing the stream with alkaline hypochlorite solution containing an alkali metal chloride or calcium chloride substantially in excess of the chemical equivalent of the alkaline hypochlorite.

In another embodiment of the invention the mercury is removed from the aqueous solution as a vapour by steam distillation.

Steam distillation within the context of this application is intended to include steam distillation by injection of 'live' steam into the solution and applying a vacuum and using the technique of single stage or multiple stage flash distillation.

A mixed vapour of steam and mercury is produced in the distillation step, which vapour may be condensed for instance by contact with a cooled surface. The cooled surface may be the external surface of pipes or tubes that are cooled internally by means of water or cold brine. The condensate may then be passed through, for example, a pad composed of fibres of small diameter to assist in coalescing the mercury droplets and then to a gravity separator or centrifuge. If the separated aqueous condensate still contains a small quantity of entrained mercury it may be recycled to the steam distillation unit or in the mercury cell chlorine process used as feed to the amalgam decomposers.

Efficient contact is preferably provided between the generated water vapour in a steam distillation process and the solution so that mass transfer of mercury from the liquid to the vapour phase is promoted. Finally the vaporisation equipment is preferably designed so that plug flow of the aqueous solution is favoured. This may be accomplished by using a number of mixed stages arranged in series.

The theoretical mass of water that must be vaporised per unit mass of mercury is given by the well-known relationship:

$$(P_{H_2O}/P_{Hg}) \times (M_{H_2O}/M_{Hg})$$

where $P_{H_2O}$ and $P_{Hg}$ are respectively the vapour pressures of water and mercury at the temperature existing in the still and $M_{H_2O}$ and $M_{Hg}$ are respectively the molecular weights of water vapour and mercury vapour. Calculated values of this factor are shown for a range of temperatures between 20° and 100°C in Table 1.

Table 1

| Vapour Pressures | |
| --- | --- |
| Temperature | Theoretical Mass Ratio |
| °C | $H_2O/H_g$ |
| 20 | 1311.6 |
| 30 | 1029.4 |
| 40 | 817.5 |
| 50 | 655.9 |
| 60 | 531.7 |
| 70 | 435.1 |
| 80 | 359.2 |
| 90 | 298.5 |
| 100 | 250.2 |

These figures refer to pure water; if the solution to be treated contains dissolved solids, as for example brine, the water vapour pressure will be lowered and the mass ratio of water to mercury correspondingly reduced. Although it is preferred to operate the process at elevated temperatures because of the favourable theoretical mass ratio of water to mercury, operation at temperatures down to ambient is possible. As an example, if a stream of brine flowing at 100,000 galls. per hour at 70°C and containing 2 mg. per litre of mercury is to be treated the mass flow of mercury is 2 lbs. per hour. If the mercury is reduced chemically to finely divided metallic form the theoretical quantity of water that must be evaporated, allowing for a reduction of water vapour pressure by the dissolved salt to about 87.5% of that of pure water is only 380 lbs. per lb. of mercury, i.e. 760 lbs per hour. Owing to the latent heat of evaporation the solution will be cooled by about 0.8°F. Although the steam efficiency will in general be less than 100% it is possible to evaporate several times the theoretical quantity in equipment of modest size and cost.

The process is particularly suitable for recovering mercury from depleted brine in the mercury cell chlorine process. This is particularly true if a "once through" brine circuit is used, the 'depleted' brine being discharged to a water course or if the depleted brine is to be resaturated by injecting into wells of underground rock strata or if a brine purification process is used after the stream has been resaturated with fresh salt of such a nature that the mercury content of the brine is precipitated and removed on the filters. With a once-through brine-system there is a particular advantage in that the hot brine need only be cooled through a small temperature range while cold brine may be used as coolant. Owing to the high temperature difference between condensing vapour and coolant the heat exchange surface may be relatively small.

A preferred embodiment of the invention will be described with reference to FIG. 1 which shows a multistage flash evaporator intended for the removal of small quantities of mercury from hot brine. The equipment consists of a vessel (1) which is designed to resist external pressure, a series of partitions (2) extending almost to the base of the vessel to divide it into any number of sections that may be desired. Each section is provided with an entrainment eliminator (3), an assembly of cooling tubes (4) a condensate collecting tray (5) and an inert gas bleed (16) connecting one section to the next. The liquid to be treated is fed in at (6) and the reducing agent may be fed in at (7) or into the first or any or all of the sections of the flash apparatus. In addition a foaming agent may be introduced into the liquid. Furthermore each chamber of the flash apparatus may be packed with a suitable packing such as crushed stone or raschig rings in order to promote a fine sub-division of the water vapour bubbles. The treated solution leaves via a barometric leg (8). It is envisaged that a hydraulic cyclone, separator or filter might be incorporated in (8) to separate any mercury remaining in the form of large droplets. Vacuum is raised by means of a steam ejector (9); since the vapour removed by the ejection may contain small quantities of mercury the exhaust steam may be condensed in a surface condenser (10) and passed to a gravity separator (11) to recover condensed mercury. The inert gases exhausted from the still may if desired be transferred to a scrubbing apparatus for removing mercury such as that described in our British Pat. Specification No. 1,250,171.

In order to control the rate of vaporisation in each chamber coolant may be fed in parallel to each bank of tubes (4). If a once-through brine process is employed the coolant can conveniently be a portion of the cold feed brine. The equipment therefore provides a measure of heat recovery since this brine must be heated before it is fed to the electrolysis cells.

The condensates from each stage can be mixed and allowed to flow through a coalescing device (12) which may be a vessel filled with small packing pieces or with a fibre pad of the type used for mist elimination followed by a gravity separator (13) and receiving vessels for mercury (14) and water (15). The separated condensate may conveiently be used to feed the amalgam decomposers, but it is within the scope of the invention to use it for any other purpose or to recycle it to the flash evaporator.

Figure 2:
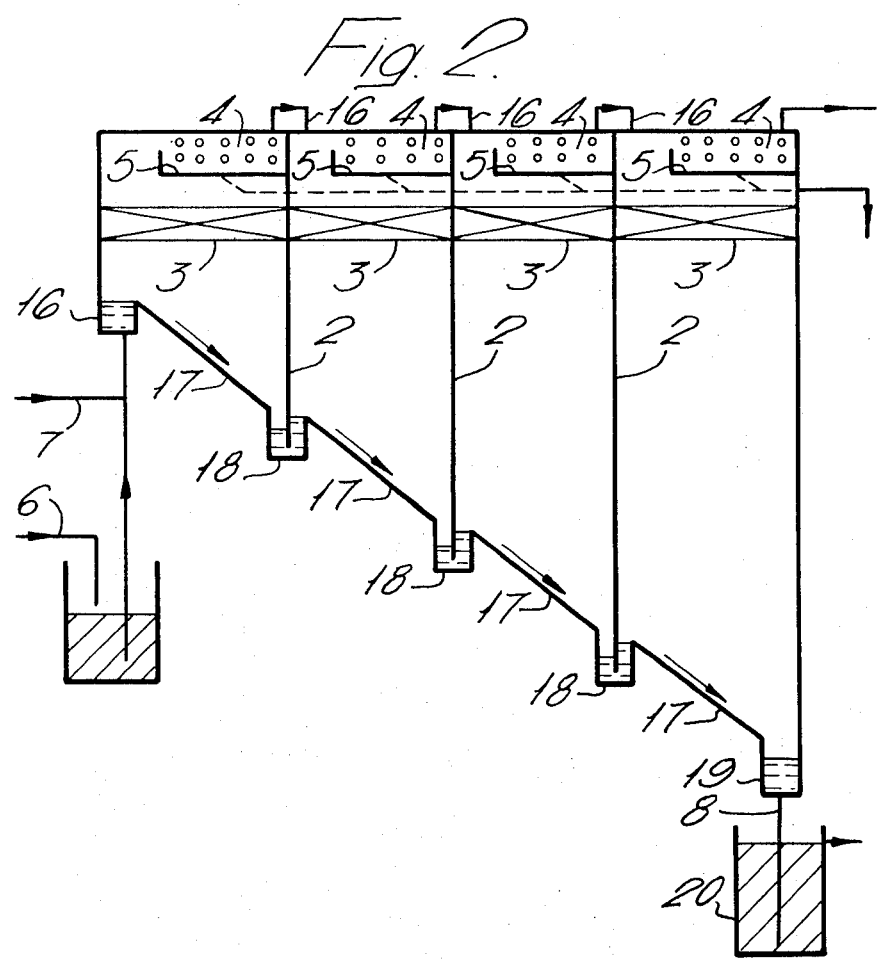

In a modification of this embodiment shown in FIG. 2 the liquid to be treated is allowed to flow down a sloping base in each chamber so that only a relatively thin film of liquid is presented for flash distillation. Referring to FIG. 2 the feed liquor is drawn up under vacuum to a sump, 16, from which it overflows over an accurately levelled weir on to the flat sloping plate 17 and discharges into a second sump, 18. The partition 2 is extended downwards so that it terminates a short distance above the bottom of sump 18 and provides a liquid seal between the first and second compartments of the flash evaporator. This is repeated in each compartment until finally the liquor in the last compartment discharges into a sump 19 which communicates with a seal tank 20. The apparatus is installed at such a height that pipe 8 acts as a barometric leg.

In a further preferred modification of the embodiment a small stream of inert gas may be introduced at the base of the vessel thus increasing the rate of mass transfer of mercury from the liquid to the vapour phase. This modification will be described with reference to FIG. 3. At the base of each compartment is fixed a sieve plate or a porous tile 21. Underneath the tiles either a single common plenum chamber or as shown separate plenum chambers 22 are provided. Air is fed to each plenum chamber through control valves 23 and flow meters 24. If necessary to overcome the pressure drop through the porous tiles a fan 25 may be provided. The inert gas is preferably air.

In this embodiment the mixture of inert gas and water vapour leaving the last section of the flash distillation apparatus is compressed to atmopsheric pressure by means of a steam ejector 9 or by means of a vacuum pump (not shown). The compressed gas vapour mixture is passed through the condenser 10, then to a gas liquid separator 11. From this separator the condensed water and mercury is fed to a liquid/liquid separator 26. The separated mercury is led via a syphon breaker 27 to a receiving vessel 28, while the water passes via syphon breaker 29 to a receiving vessel 30.

The gas leaving separator 11 may be scrubbed to remove its mercury vapour content by means of a packed tower 31 or other suitable gas scrubbing equipment. The tower 31 may be irrigated with an alkaline hypochlorite solution in accordance with our British Pat. Specification No. 1,250,171 supplied from a circulating tank 32 and pump 33.

The process may also be used for recovering mercury from cold solutions, but it will then be necessary to operate over a wider temperature range on account of the greater theoretical weight ratio of water to mercury at lower temperatures as shown in Table 1 and it will be necessary to operate under higher vacuum. In addition a larger heat exchange surface will be required for a given rate of mercury recovery.

The mercury may be removed from the aqueous solution as a vapour by a combination of the methods hereinbefore described i.e. by passing a stream of inert gas through the solution and by steam distillation.

The process of the invention is also useful for removing the last few parts per million by weight of mercury from caustic soda solutions manufactured by the mercury cathode process. It is particularly desirable that the mercury contaminant should be removed to improve the purity of the product if it is to be used in foodstuffs manufacture.

The invention is illustrated by the following examples:

EXAMPLE 1

To a solution containing approximately 40 mg/$l$ sodium chloride, 2.8 mg/$l$ available chlorine and 1.7 mg/$l$ of mercury at 70°C and pH 10.6 was added sufficient ferrous sulphate to provide 0.2 g/$l$ of iron. A stream of air was simultaneously blown through the solution from a diffuser plate. After 1 minute the mercury content of the solution had been reduced to less than 0.1 mg/$l$.

EXAMPLE 2

A solution containing approximately 2 mg/$l$ mercury, added as mercuric chloride, was passed through a bed of crescent-shaped mild steel chips held on a diffuser plate at a temperature of 65°C and a pH of 10. The chips were approximately 1.3 cm diameter and had a maximum thickness of 0.5 cm. The volume of the bed was 3,500 cm$^3$ and the height 10 cm. At the same time a stream of air was blown through the bed from the diffuser plate. The effluent stream contained 0.02 mg/$l$ of mercury i.e. 99% of the mercury had been removed. The mean retention time in the reactor was 10 minutes. Under the same conditions, but without the stream of air, the effluent stream contained 0.20 mg/litre mercury, i.e. air blowing had improved the removal of mercury significantly.

Similar results were obtained when the pH of the solution was 3.

EXAMPLE 3

To a solution containing 200 g/litre sodium chloride and 3.9 mg/litre mercury was added 200 mg/litre hydrazine sulphate. The temperature of the mixture was 63°C and the pH, 11.0. A stream of air was blown through the solution from a diffuser plate. After 1 minute the mercury content of the solution had been reduced to 0.12 mg/litre. After 10 minutes the mercury content of the solution was 0.03 mg/litre.

EXAMPLE 4

To a solution containing 200 g/litre sodium chloride, 5 mg/litre available chlorine and 3.8 mg/litre mercury was added 43 mg/litre hydroxylamine hydrochloride. The temperature of the mixture was 62°C and the pH, 11.0. A stream of air was blown through the solution from a diffuser plate. After 1 minute the mercury content of the solution had been reduced to 0.11 mg/litre.

EXAMPLE 5

To a solution containing 200 g/litre sodium chloride and 4.2 mg/litre mercury was added 14.3 mg/litre D-glucose. The temperature of the mixture was 62°C and the pH 11.0. After a reaction time of 5 minutes a stream of air was blown through the solution from a diffuser plate. After a further 1 minute the mercury content of the solution had been reduced to 0.9 mg/litre. After 10 minutes air blowing the solution contained 0.06 mg/litre mercury.

EXAMPLE 6

To a solution containing 200 g/litre sodium chloride and 3.9 mg/litre mercury was added 0.29 mg/litre sodium borohydride. The temperature of the mixture was 60°C and the pH.11. A stream of air was blown through the solution from a diffuser plate. After 1 minute the mercury content of the solution was reduced to 0.24 mg/litre. After 10 minutes the solution contained 0.06 mg/litre mercury.

EXAMPLE 7

To a solution containing 250 g/litre sodium chloride, 20 mg/litre available chlorine, 2.0 g/litre sodium chlorate and 4.1 mg/litre mercury at 61°C and pH 11 was first added 143 mg/litre $Na_2SO_3.7H_2O$ to reduce the available chlorine only. To the mixture was added 0.29 mg/litre sodium borohydride. A stream of air was then blown through the solution from a diffuser plate. After 1 minute the mercury content of the solution was reduced to 0.06 mg/litre.

This example demonstrates the stagewise reduction of chlorine and mercury in the presence of sodium chlorate, using sodium sulphite and sodium borohydride.

EXAMPLE 8

800 ml of brine containing 200 g/$l$ NaCl, 4 mg/$l$ available chlorine and 5 mg/$l$ mercury, added as mercuric chloride, were heated to 70°C. To this solution was added 20 ml of 2.5% w/w hydrazine sulphate and 4.0 ml 47% w/w NaOH. The mixture was immediately flash evaporated under vacuum until it had cooled to 60°C. A sample was reserved for analysis. The flash evaporation was repeated once more.

The analysis of samples showed that during the first evaporation the mercury concentration fell from 5.0 mg/$l$ to 2.4 mg/$l$, in the second evaporation to 1.6 mg/$l$ and in the third to 1.1 mg/$l$.

EXAMPLE 9

800 ml of brine at pH 11, containing 200 g/$l$ NaCl, 4 mg/$l$ available chlorine and 5 mg/$l$ mercury, added as mercuric chloride were heated to 80°C. To this solution was added 2 ml of sodium borohydride solution containing 1 g/$l$ NaBH$_4$ dissolved in 40% w/w NaOH. The mixture was immediately flash evaporated under vacuum until the solution was cooled to 70°C. A sample was then removed for analysis. The main solution was then reheated to 80°C and flash evaporated again to 70°C. A further sample was removed for analysis.

The results showed that during the first evaporation the mercury content fell from 5.0 mg/$l$ to 2.0 mg/$l$ and during the second evaporation was further reduced to 1.2 mg/$l$.

A similar experiment adding 2 ml of 40% w/w NaOH, not containing sodium borohydride, showed little or no removal of Mercury from the solution.

EXAMPLE 10

800 ml of brine at pH 11 containing 200 g/$l$ NaCl, 4 mg/$l$ available chlorine and 5 mg/$l$ mercury, added as mercuric chloride were heated to 80°C. To this solution was added 2 ml of sodium borohydride containing 1 mg/$l$ NaBH$_4$ dissolved in 40% w/w NaOH. The mixture was immediately flash evaporated to 70°C under vacuum with an air bleed into the solution through a glass sinter. The air bleed rate was 35 ml/min, measured at room temperature and atmospheric pressure. A sample was then removed for analysis.

The main solution was reheated to 80°C and again flash evaporated with the air bleed to 70°C. The flash evaporation was repeated once more.

The analysis of samples showed that during the first evaporation the mercury concentration in the solution fell from 4.7 mg/l to 0.37 mg/l in the second evaporation to 0.11 mg/l, and in the third to 0.02 mg/l.

I claim:

1. A process for the removal and recovery of mercury from aqueous solutions containing a soluble inorganic compound of mercury and having a mercury concentration not more than 100 milligrams per liter which comprises treating said aqueous solution with a chemical reducing agent selected from the group consisting of ferrous sulphate at a pH greater than 5, hydrazine, iron or steel turnings or chips, hydroxylamine, D-glucose and sodium borohydride to precipitate finely divided elemental mercury, removing said mercury by applying a vacuum and using single stage or multiple stage flash distillation, and recovering said mercury from the vapor.

2. A process as defined in claim 1 wherein said elemental mercury is removed by passing a stream of inert gas through the mercury containing aqueous solution, applying a vacuum and using multiple or single stage flash distillation.

3. A process as defined in claim 1 wherein at least a portion of said soluble inorganic compound of mercury is formed by treating elemental mercury, organic compounds of mercury, or water-insoluble inorganic compounds of mercury with an oxidizing agent.

4. A process as defined in claim 3 wherein said oxidizing agnet is chlorine or nitric acid.

5. A process as defined in claim 1 wherein said reducing agent is sodium borohydride and the treatment with said reducing agent is carried out at a pH of 11.

6. A process as defined in claim 1 wherein any oxidizing agents, other than mercury compounds, present in the aqueous solution are first reduced with sodium sulphite or sulphur dioxide.

7. A process as defined in claim 1 wherein in the step of recovering said mercury from the vapor the vapor is condensed by contact with a cooled surface.

8. A process as defined in claim 7 wherein said mercury is separated from the condensate by passage through a bed composed of fibers of small diameter and then a gravity separator or centrifuge.

9. A process as defined in claim 1 wherein said aqueous solution being treated is depleted brine from a mercury cell chlorine process.

* * * * *

Disclaimer 3,857,704.—*Michael Oliver Coulter*, near Crewe, England. MERCURY RECOVERY PROCESS. Patent dated Dec. 31, 1974. Disclaimer filed Jan. 10, 1975, by the assignee, *BP Chemicals Limited*.

Hereby disclaims the portion of the term of the patent which would extend beyond Nov. 12, 1991.

[*Official Gazette May 27, 1975.*]